US009961176B2

(12) United States Patent
Ye (10) Patent No.: US 9,961,176 B2
(45) Date of Patent: May 1, 2018

(54) COMMUNICATION SYSTEM WITH RADIO INTERWORKING CAPABILITY AND RELATED USER EQUIPMENT

(71) Applicant: ACER INCORPORATED, New Taipei (TW)

(72) Inventor: Shiang-Rung Ye, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 128 days.

(21) Appl. No.: 14/449,488

(22) Filed: Aug. 1, 2014

(65) Prior Publication Data

US 2015/0045015 A1    Feb. 12, 2015

Related U.S. Application Data

(60) Provisional application No. 61/863,388, filed on Aug. 7, 2013, provisional application No. 61/886,858, filed on Oct. 4, 2013.

(51) Int. Cl.
    *H04W 24/04* (2009.01)
    *H04M 1/24* (2006.01)
    *H04W 48/08* (2009.01)

(52) U.S. Cl.
    CPC .............. *H04M 1/24* (2013.01); *H04W 24/04* (2013.01); *H04W 48/08* (2013.01)

(58) Field of Classification Search
    CPC ........... H04W 52/243; H04W 72/0446; H04W 24/04; H04W 48/08; H04M 1/24
    (Continued)

(56) References Cited

U.S. PATENT DOCUMENTS

2011/0110300 A1*  5/2011  Sachs ................... H04W 48/18
                                                370/328
2012/0324100 A1* 12/2012  Tomici ................. H04L 45/123
                                                709/224

(Continued)

FOREIGN PATENT DOCUMENTS

WO    WO 2012/142437 A1    10/2012

OTHER PUBLICATIONS

3rd Generation Partnership Project; Technical Specification Group Radio Access Network; Study on WLAN/3GPP Radio Interworking (Release 12), France, May 2013, pp. 1-14.

(Continued)

*Primary Examiner* — Kamran Afshar
*Assistant Examiner* — Farid Seyedvosoghi
(74) *Attorney, Agent, or Firm* — Birch, Stewart, Kolasch & Birch, LLP (57) ABSTRACT

A user equipment of a communication system includes a first communication circuit configured to operably receive ANDSF rule set and RAN rule transmitted from a communication station; a second communication circuit; and a control circuit configured to operably: select a target ANDSF rule out of the ANDSF rule set; determine whether the user equipment fulfills all validity conditions of the target ANDSF rule; select a target access network out of a prioritized network list defined by the target ANDSF rule if all validity conditions of the target ANDSF rule are fulfilled; determine whether the target access network fulfills all validity conditions of the RAN rule if the target access network is present; and control the second communication circuit to steer traffic specified in the target ANDSF rule or traffic specified in the RAN rule to a target access point of the target access network.

6 Claims, 5 Drawing Sheets

(58) Field of Classification Search
USPC .......................................................... 455/424
See application file for complete search history.

(56) References Cited

U.S. PATENT DOCUMENTS

| | | | | |
|---|---|---|---|---|
| 2014/0003239 A1* | 1/2014 | Etemad | ................. | H04W 28/08 |
| | | | | 370/235 |
| 2014/0023059 A1* | 1/2014 | Gupta | ................... | H04W 36/34 |
| | | | | 370/338 |

OTHER PUBLICATIONS

3rd Generation Partnership Project; Technical Specification Group Services and System Aspects; Architecture enhancements for non-3GPP accesses (Release 12), France, Jun. 2013, pp. 1-254.

BlackBerry UK Limited, Breakdown of work to support WLAN interworking, 3GPP TSG-RAN WG2 Meeting #85, Prague, Czech Republic, Feb. 10-14, 2014.

Broadcom Corporation, On CN baseline for WLAN/3GPP Radio Interworking solutions, 3GPP TSG-RAN WG2 Meeting #81-BIS, Apr. 15-19, 2013, Chicago, USA, pp. 1-5.

Huawei, Auto Selection Activation, 3GPP TSG CT WG1 Meeting #58, Sophia Antipolis (France), Apr. 20-24, 2009, pp. 1-4.

* cited by examiner

COMMUNICATION SYSTEM WITH RADIO INTERWORKING CAPABILITY AND RELATED USER EQUIPMENT

CROSS-REFERENCE TO RELATED APPLICATIONS

This application claims the benefit of priority to U.S. Provisional Application Ser. No. 61/863,388, filed on Aug. 7, 2013; the entirety of which is incorporated herein by reference for all purposes.

This application claims the benefit of priority to U.S. Provisional Application Ser. No. 61/886,858, filed on Oct. 4, 2013; the entirety of which is incorporated herein by reference for all purposes.

BACKGROUND

The disclosure generally relates to a communication system and, more particularly, to a communication system with radio interworking capability and related user equipment.

A base station of a mobile communication network is only capable of communicating with a certain number of user equipments within a certain wireless transmission range. Therefore, many technologies have been developed to increase the amount of user equipments that can be served in a certain area, to balance the load in the mobile communication network, to improve the communication quality, etc. For example, the traditional mobile communication network may adopt a radio interworking mechanism to provide both the 3GPP radio access resources and the wireless local area network (abbreviated as WLAN) radio access resources at the same time so as to improve the system performance.

Traditional core network based WLAN interworking mechanisms, such as ANDSF (Access Network Discovery and Selection Function), have defined an access network selection method for instructing the user equipment to select an available WLAN according to predetermined intersystem mobility information. Different access network selection method in the RAN (Radio Access Network) level is being currently developed in order to further improve the WLAN/3GPP interworking performance.

Accordingly, ANDSF based access network selection method and different RAN based access network selection method may be applied to the user equipment at the same time in the future. Without proper integration of the access network selection methods defined in different levels, the user equipment may not able to fulfill the intersystem mobility policy configured by the mobile communication network operator.

SUMMARY

In view of the foregoing, it may be appreciated that a substantial need exists for apparatuses that mitigate or reduce the problems above.

An example embodiment of a communication system is disclosed, comprising: a communication station, comprising: a transceiving circuit; a storage device configured to operably store an ANDSF (Access Network Discovery and Selection Function) rule set and a RAN (Radio Access Network) rule, wherein the RAN rule comprises one or more RAN validity conditions and a traffic specification, the ANDSF rule set comprises one or more ANDSF rules and each ANDSF rule comprises one or more ANDSF validity conditions and a prioritized network list; and a processor module, coupled with the transceiving circuit and the storage device, configured to operably control the transceiving circuit to transmit the ANDSF rule set and the RAN rule; multiple access points comprising a target access point; and a user equipment, comprising: a first communication circuit configured to operably receive the ANDSF rule set and the RAN rule transmitted from the transceiving circuit; a second communication circuit configured to operably communicate with the multiple access points; a memory device configured to operably store the ANDSF rule set and the RAN rule received by the first communication circuit; and a control circuit, coupled with the first communication circuit, the second communication circuit, and the memory device, configured to operably: select a target ANDSF rule out of the ANDSF rule set; determine whether the user equipment fulfills all validity conditions of the target ANDSF rule; select a target access network out of a prioritized network list defined by the target ANDSF rule if all validity conditions of the target ANDSF rule are fulfilled; control the second communication circuit to scan the target access network so as to determine whether the target access network is present or not; determine whether the target access network fulfills all validity conditions of the RAN rule if the target access network is present; and control the second communication circuit to steer traffic specified in the target ANDSF rule or traffic specified in the RAN rule to the target access point of the target access network if the target access network fulfills all validity conditions of the RAN rule.

Another example embodiment of a user equipment of a communication system is disclosed. The communication system comprises a communication station and multiple access points, and the multiple access points comprise a target access point. The user equipment comprising: a first communication circuit configured to operably receive a ANDSF rule set and a RAN rule transmitted from the communication station, wherein the RAN rule comprises one or more RAN validity conditions and a traffic specification, the ANDSF rule set comprises one or more ANDSF rules and each ANDSF rule comprises one or more ANDSF validity conditions and a prioritized network list; a second communication circuit configured to operably communicate with the multiple access points; a memory device configured to operably store the ANDSF rule set and the RAN rule received by the first communication circuit; and a control circuit, coupled with the first communication circuit, the second communication circuit, and the memory device, configured to operably: select a target ANDSF rule out of the ANDSF rule set; determine whether the user equipment fulfills all validity conditions of the target ANDSF rule; select a target access network out of a prioritized network list defined by the target ANDSF rule if all validity conditions of the target ANDSF rule are fulfilled; control the second communication circuit to scan the target access network so as to determine whether the target access network is present or not; determine whether the target access network fulfills all validity conditions of the RAN rule if the target access network is present; and control the second communication circuit to steer traffic specified in the target ANDSF rule or traffic specified in the RAN rule to the target access point of the target access network if the target access network fulfills all validity conditions of the RAN rule.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
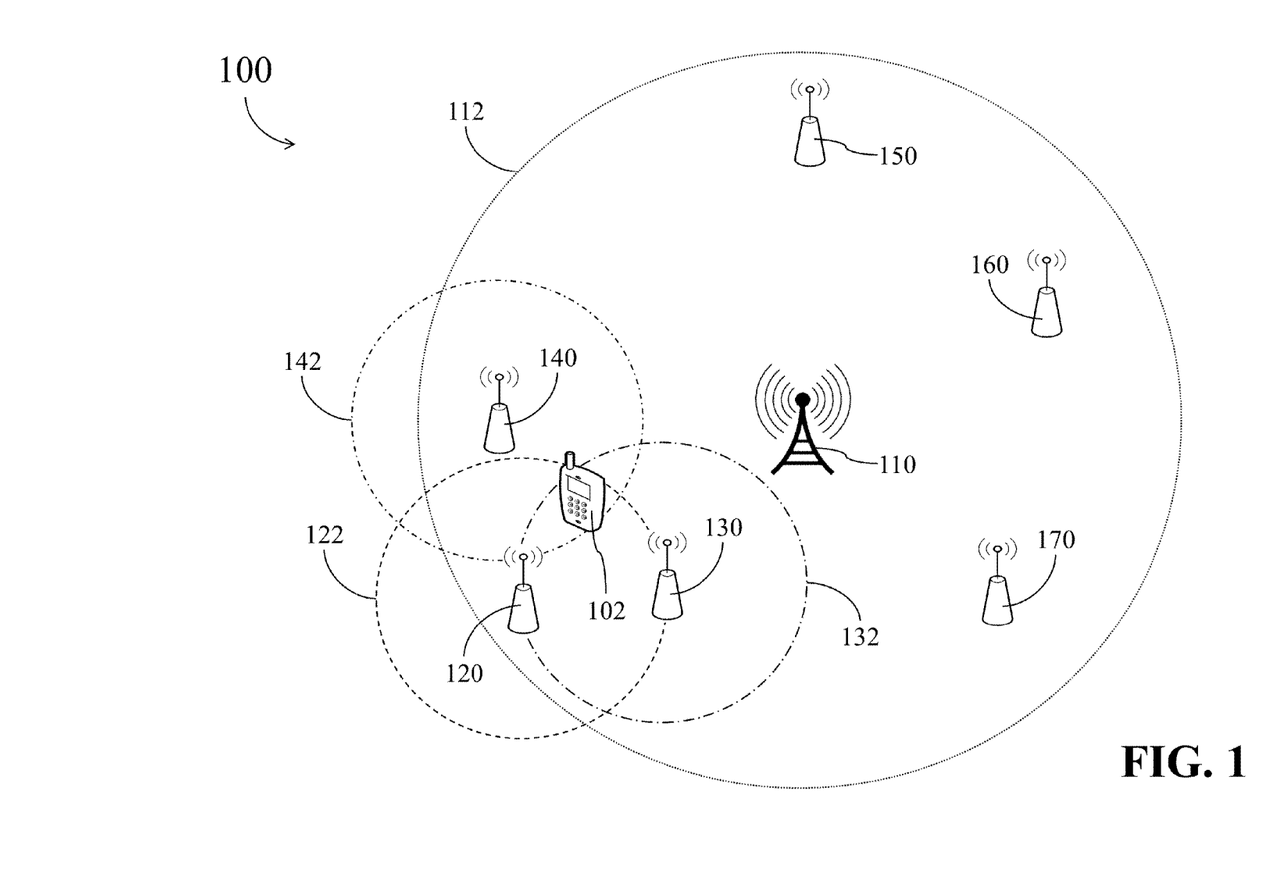
FIG. 1 shows a simplified schematic diagram of a communication system according to one embodiment of the present disclosure.

FIG. 1 shows a simplified schematic diagram of a communication system 100 according to one embodiment of the present disclosure. In this embodiment, the communication system 100 comprises a user equipment 102, a communication station 110, and multiple access points (e.g., access points 120-170 as shown in FIG. 1). As shown in FIG. 1, the communication station 110 has a wireless transmission range 112. The access point 120 belongs to a first access network 122, the access point 130 belongs to a second access network 132, and the access point 140 belongs to a third access network 142. In this embodiment, the access network 122, 132, and 142 are neighboring access networks.

Figure 2:
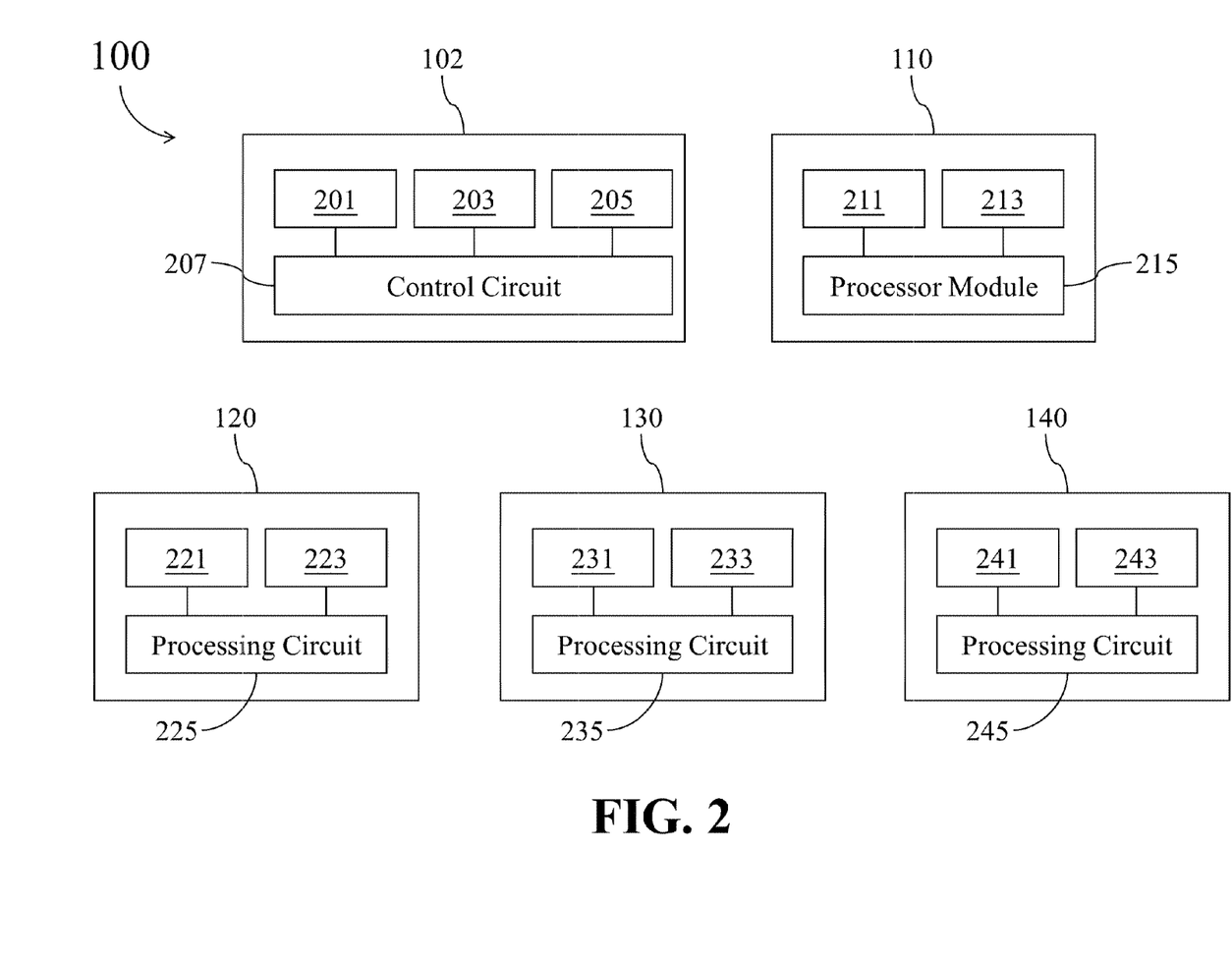
FIG. 2 shows a simplified functional block diagram of some member devices in the communication system of FIG. 1 according to one embodiment of the present disclosure.

FIG. 2 shows a simplified functional block diagram of some member devices in the communication system 100 of FIG. 1 according to one embodiment of the present disclosure. As shown in FIG. 2, the user equipment 102 comprises a first communication circuit 201, a second communication circuit 203, a memory device 205, and a control circuit 207. The communication station 110 comprises a transceiving circuit 211, a storage device 213, and a processor module 215. Each of the access points 120-170 comprises a transmission circuit, an AP memory, and a processing circuit. For example, the access point 120 comprises a transmission circuit 221, an AP memory 223, and a processing circuit 225; the access point 130 comprises a transmission circuit 231, an AP memory 233, and a processing circuit 235; the access point 140 comprises a transmission circuit 241, an AP memory 243, and a processing circuit 245; and so forth.

In the communication station 110, the transceiving circuit 211 is configured to operably transmit signal by utilizing a first radio access technology (abbreviated as RAT). The storage device 213 is configured to operably store an ANDSF (Access Network Discovery and Selection Function) rule set and a RAN (Radio Access Network) rule. The processor module 215 is coupled with the transceiving circuit 211 and the storage device 213. The processor module 215 is configured to operably control the transceiving circuit 211 to transmit the ANDSF rule set and the RAN rule to user equipments within the wireless transmission range 112. In operations, the communication station 110 provides ISMP (Inter-System Mobility Policy), ISRP (Inter-System Routing Policy), and access network discovery information to the user equipments within the wireless transmission range 112 through the ANDSF rule set.

In the user equipment 102, the first communication circuit 201 is configured to operably receive the ANDSF rule set and the RAN rule transmitted from the transceiving circuit 211 by utilizing the first RAT. The second communication circuit 203 is configured to operably communicate with other devices (e.g., one or more access points) by utilizing a second RAT different from the first RAT. The memory device 205 is configured to operably store the ANDSF rule set and the RAN rule received by the first communication circuit 201. The control circuit 207 is coupled with the first communication circuit 201, the second communication circuit 203, and the memory device 205. The control circuit 207 is configured to operably select a target ANDSF rule out of the ANDSF rule set; determine whether the user equipment fulfills all validity conditions of the target ANDSF rule; select a target access network out of a prioritized network list defined by the target ANDSF rule if all validity conditions of the target ANDSF rule are fulfilled; control the second communication circuit to scan the target access network so as to determine whether the target access network is present or not; determine whether the target access network fulfills all validity conditions of the RAN rule if the target access network is present; and control the second communication circuit to steer traffic specified in the target ANDSF rule or traffic specified in the RAN rule to the target access point of the target access network if the target access network fulfills all validity conditions of the RAN rule.

In each of the access points 120-170, the transmission circuit is configured to operably communicate with the user equipment 102 by utilizing the second RAT. In some embodiments, the AP memory is configured to operably store computer programs and information required for controlling the operations of the access point. The processing circuit is coupled with the transmission circuit and the AP memory.

The term "RAN rule" as used throughout the description and the claims refers to any appropriate RAN based access network selection guiding information utilized for instructing the user equipment 102 to select available access network for traffic steering. In practice, the RAN rule may comprise one or more RAN validity conditions and a traffic specification, and the RAN validity condition may be related to the traffic load of the access network, the signal quality of the access network, and/or other RAN level performance. The term "ANDSF rule set" as used throughout the description and the claims refers to any appropriate information containing one or more ANDSF rules. The term "ANDSF rule" as used throughout the description and the claims refers to any appropriate ANDSF based access network selection guiding information utilized for instructing the user equipment 102 to select available access network for traffic steering. In practice, each ANDSF rule comprises one or more ANDSF validity conditions and a prioritized network list, and each ANDSF validity condition may be related to the location of the user equipment, the time of a day, the roaming status, and/or other ANDSF level conditions. The ANDSF validity conditions are typically different from the RAN validity conditions.

In some applications, each ANDSF rule may further comprise a traffic specification. In practice, the traffic specification specified in the ANDSF rule may be the same with or may be different from the traffic specification specified in the RAN rule.

In practice, each of the transceiving circuit 211 and the first communication circuit 201 may comprise one or more antennas, one or more modulators/demodulators, one or more analog signal processing circuits, and/or one or more digital processing circuits for communicating with other devices by utilizing the first RAT. Each of the second communication circuit 203 and the transmission circuit of each of the access points 120-170 may comprise one or more antennas, one or more modulators/demodulators, one or more analog signal processing circuits, and/or one or more digital processing circuits for communicating with other devices by utilizing the second RAT.

Each of the storage device 213, the memory device 205, and the AP memory of each of the access points 120-170 may be realized with one or more volatile/non-volatile memory circuits, such as registers, hard drives, or flash memory devices.

Each of the processor module 215, the control circuit 207, and the processing circuit of each of the access points 120-170 may be realized with one or more microprocessors, one or more network processors, one or more digital signal processing circuits, and/or other suitable processing circuits.

For the purposes of conciseness and clear explanation, some components and connections of the communication system 100 are not shown in FIG. 1.

As can be appreciated from the foregoing descriptions, the user equipment 102 is capable of communicating with the communication station 110 adopting the first RAT while communicating with an available access point adopting the second RAT. In practice, the first RAT may refer to one or more wireless wide area network (abbreviated as WWAN) technologies, wireless metropolitan area network (abbreviated as WMAN) technologies, or other suitable wire communication technologies with a wider communication range, such as WiMAX, GSM, UMTS, HSPA, LTE, LTE-Advanced and other 3GPP RATs. The second RAT may refer to one or more WLANs technologies, or other suitable wire communication technologies with a shorter communication range (compared with the first RAT), such as IEEE 802.11 series RATs.

For the illustrative purpose, it is assumed hereinafter that the first RAT is referred to at least one of the 3GPP RATs and the second RAT is referred to at least one of the IEEE 802.11 series RATs. Thus, the communication station 110 may be realized with a 3GPP base station (abbreviated as BS), such as a Node B or an Evolved Node B (abbreviated as eNodeB or eNB). In addition, each of the access points 120-170 may be realized with an IEEE 802.11 wireless access point. In practice, the communication station 110 and an access point may be co-located in substantially the same location.

Each of the communication station 110 and the access points 120-170 may be coupled with one another through an appropriate network (not shown in FIG. 1). The aforementioned network may be realized with one or more wired networks and/or wireless networks, and may comprise one or more backhaul networks, one or more core networks, one or more gateways, one or more servers and/or other network equipments (not shown in FIG. 1).

The operations of the communication system 100 will be further described in the following by reference to FIG. 3 and FIG. 4.

Figure 3:
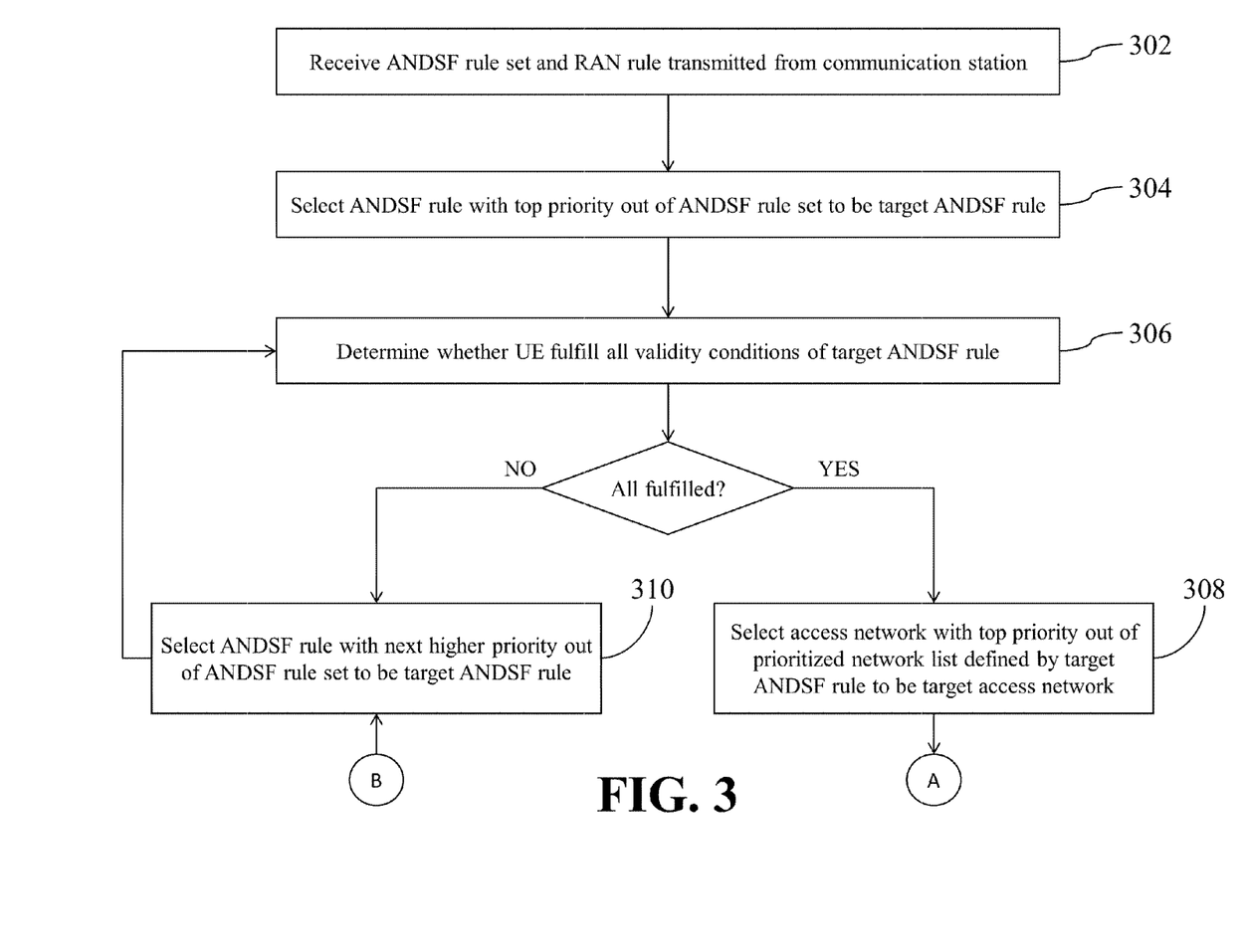
FIGS. 3-4 collectively show a simplified flowchart of an access network selection method according to one embodiment of the present disclosure.
Figure 4:
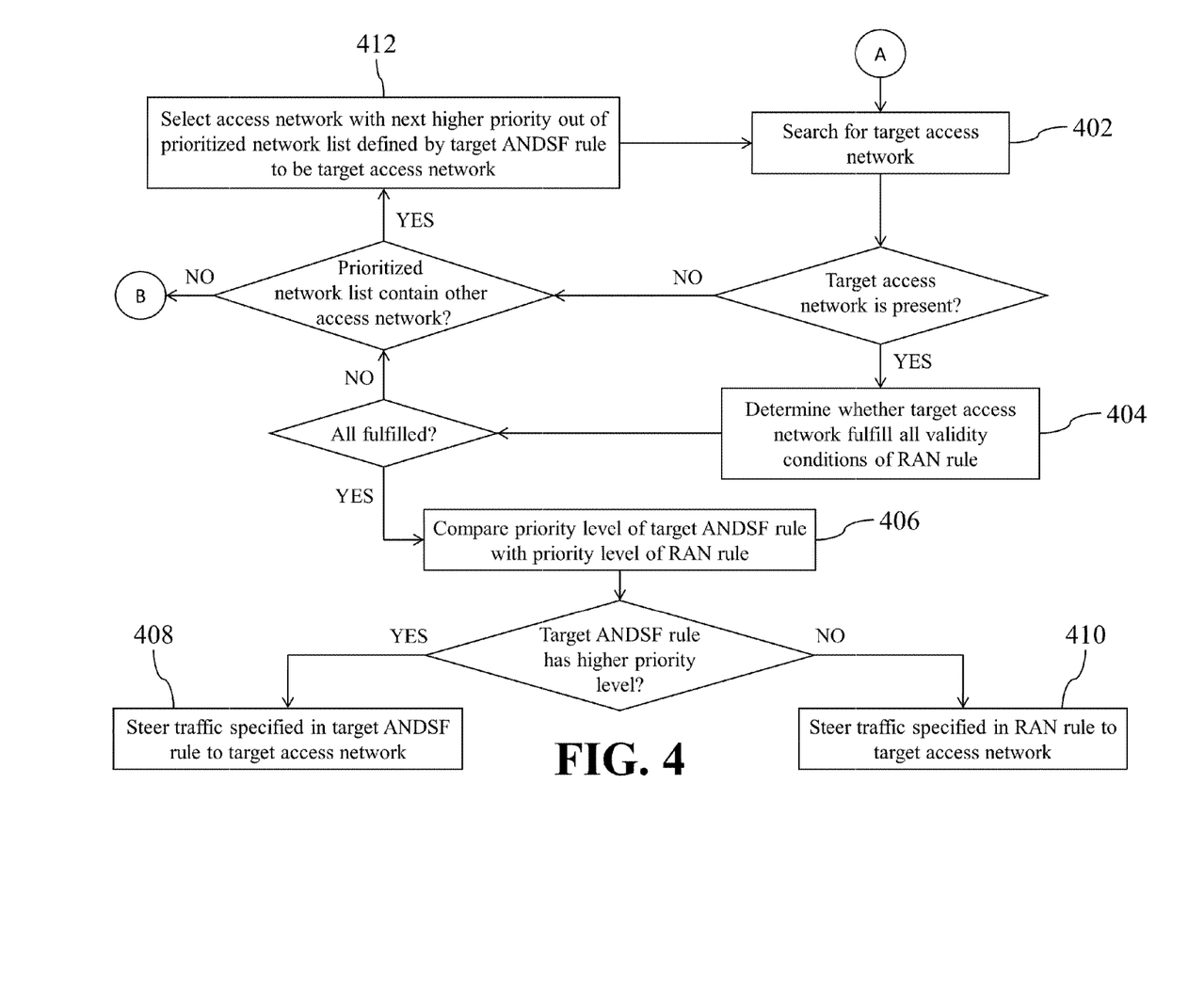

FIGS. 3-4 collectively show a simplified flowchart of an access network selection method conducted by the user equipment 102 according to one embodiment of the present disclosure.

When the user equipment 102 is located within the wireless transmission range 112 of the communication station 110, the processor module 215 of the communication station 110 may control the transceiving circuit 211 to transmit an ANDSF rule set and a RAN rule to the user equipment 102. As described previously, the RAN rule comprises one or more RAN validity conditions and a traffic specification, the ANDSF rule set comprises one or more ANDSF rules, and each ANDSF rule comprises one or more ANDSF validity conditions and a prioritized network list. In operations, the processor module 215 may control the transceiving circuit 211 to transmit the ANDSF rule set and the RAN rule to the user equipment 102 by sending one or more dedicated messages to the user equipment 102 or by broadcasting.

In addition, the processor module 215 may control the transceiving circuit 211 to transmit the ANDSF rule set and the RAN rule to the user equipment 102 at different time points.

In operation 302, the first communication circuit 201 of the user equipment 102 receives the ANDSF rule set and the RAN rule transmitted from the transceiving circuit 211. In addition, the control circuit 207 of the user equipment 102 stores the ANDSF rule set and the RAN rule received by the first communication circuit 201 into the memory device 205.

In operation 304, the control circuit 207 selects a target ANDSF rule out of the received ANDSF rule set. For example, the control circuit 207 may select an ANDSF rule with top priority out of the received ANDSF rule set to be a target ANDSF rule.

In operation 306, the control circuit 207 determines whether the user equipment 102 fulfills all validity conditions of the target ANDSF rule. If the user equipment 102 fulfills all validity conditions of the target ANDSF rule, the control circuit 207 proceeds to operation 308. If the user equipment 102 does not fulfill all validity conditions of the target ANDSF rule, the control circuit 207 proceeds to operation 310.

In operation 308, the control circuit 207 selects a target access network out of a prioritized network list defined by the target ANDSF rule. For example, the control circuit 207 may select an access network with top priority out of the prioritized network list defined by the target ANDSF rule to be the target access network.

In operation 310, the control circuit 207 selects a new target ANDSF rule out of the ANDSF rule set. For example, the control circuit 207 may select an ANDSF rule with next higher priority out of the ANDSF rule set to be a new target ANDSF rule.

For the illustrative purpose, it is assumed hereinafter that the first access network 122 to which the access point 120 belongs is the target access network selected by the control circuit 207 in the operation 308. Then, the user equipment 102 proceeds to operation 402 of FIG. 4.

In operation 402, the control circuit 207 controls the second communication circuit 203 to search for the selected target access network. In operations, the control circuit 207 may control the second communication circuit 203 to scan the frequency in which the target access network deployed so as to determine whether the target access network is present or not. If the target access network is present (i.e., the user equipment 102 is located within the wireless transmission range of the target access network), the control circuit 207 proceeds to operation 404.

In operation 404, the control circuit 207 determines whether the current target access network fulfills all validity conditions of the received RAN rule. If the current target access network fulfills all validity conditions of the received RAN rule, the control circuit 207 proceeds to operation 406.

In operation 406, the control circuit 207 compares a priority level of the current target ANDSF rule with a priority level of the RAN rule so as to determine which traffic to be steered to the access point 120 of the target access network 122. In operations, the priority level of the ANDSF rules and the RAN rule are configured by the operator of the communication system 100. In this embodiment, if the priority level of the target ANDSF rule is higher than the priority level of the RAN rule, the control circuit 207 proceeds to operation 408. On the contrary, if the priority level of the target ANDSF rule is less than the priority level of the RAN rule, the control circuit 207 proceeds to operation 410.

In operation 408, the control circuit 207 controls the second communication circuit 203 to steer traffic specified in the target ANDSF rule to the access point 120 of the target access network 122.

In operation 410, the control circuit 207 controls the second communication circuit 203 to steer traffic specified in the RAN rule to the access point 120 of the target access network 122.

In practice, if the priority level of the target ANDSF rule is equal to the priority level of the RAN rule, the control circuit 207 may select one of the target ANDSF rule and the RAN rule as a default rule according to a predetermined configuration, and control the second communication circuit 203 to steer traffic specified in the default rule to the access point 120 of the target access network 122.

If the control circuit 207 determines that the target access network is not present in the operation 402, the control circuit 207 determines whether the prioritized network list contains other access network or not. In this situation, the control circuit 207 proceeds to operation 412 if the prioritized network list contains other access network, and proceeds to the operation 310 of FIG. 3 if there is no other access networks contained in the prioritized network list.

In addition, if the control circuit 207 determines that the current target access network does not fulfill all validity conditions of the received RAN rule, the control circuit 207 determines whether the prioritized network list contains other access network or not. In this situation, the control circuit 207 proceeds to the operation 412 if the prioritized network list contains other access network, and proceeds to the operation 310 of FIG. 3 if there is no other access networks contained in the prioritized network list.

In operation 412, the control circuit 207 selects a new target access network out of the prioritized network list defined by the current target ANDSF rule. For example, the control circuit 207 may select an access network with next higher priority out of the prioritized network list defined by the current target ANDSF rule to be the new target access network.

As can be appreciated from the forgoing descriptions, the user equipment 102 only needs to determine whether the current target access network fulfills all validity conditions of the RAN rule in the operation 404, and needs not to scan for other available access networks, and needs not to respectively determine whether each of other available access network fulfills all validity conditions of the RAN rule. Therefore, the user equipment 102 is enabled to rapidly identify an available access point for traffic steering without spending unnecessary battery power to scan for other access networks. In this way, the power consumption of the user equipment 102 can be significantly reduced, thereby improving the power saving performance of the user equipment 102 and extending the standby time of the user equipment 102.

The access selection method illustrated in FIGS. 3-4 is merely an example rather than a restriction to the practical operation of the user equipment 102.

Figure 5:
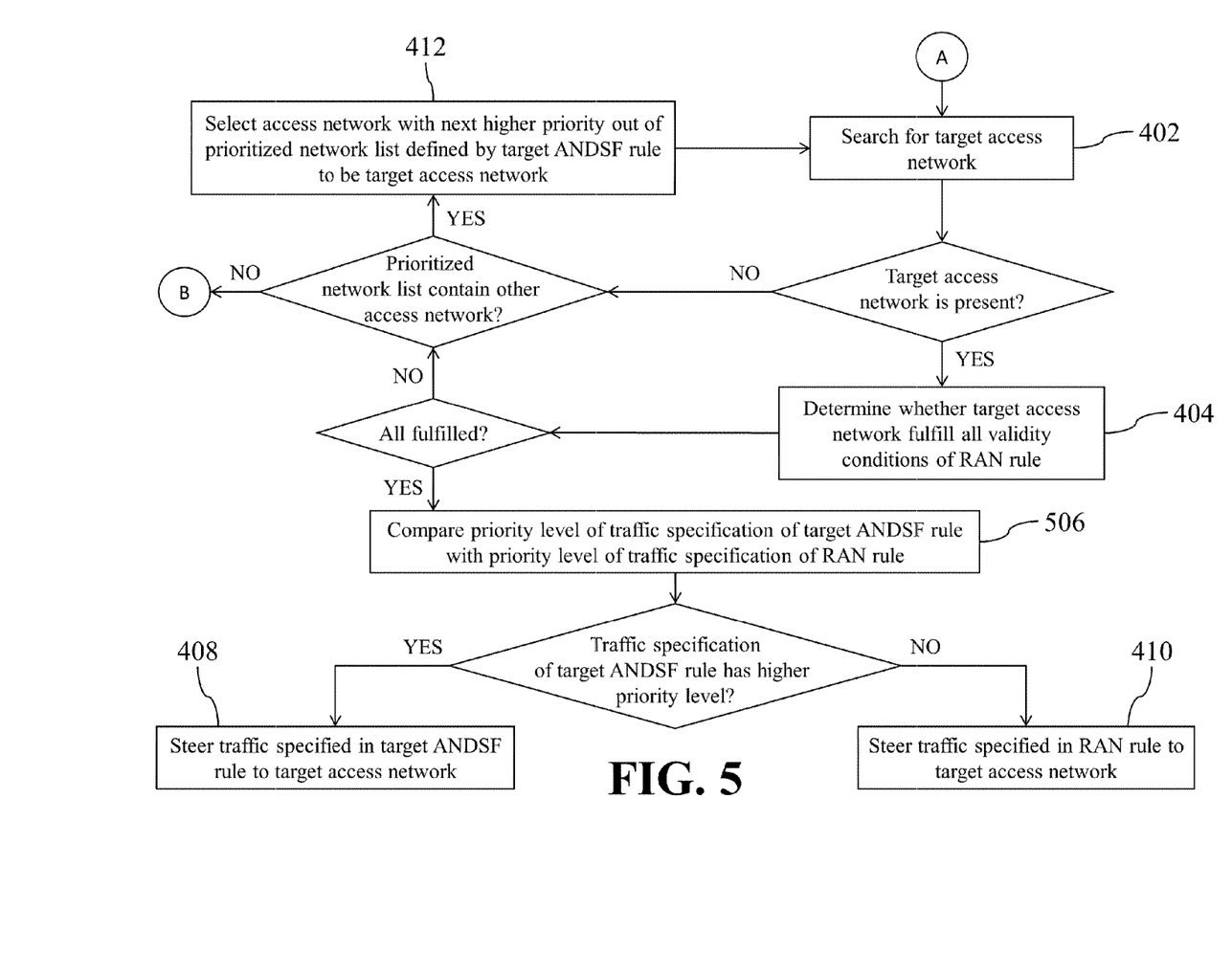
FIG. 5 shows a simplified partial flowchart of an access network selection method according to another embodiment of the present disclosure.

For example, FIG. 5 shows a simplified partial flowchart of an access network selection method according to another embodiment of the present disclosure. The flowchart illustrated in FIG. 5 is similar to the flowchart of FIG. 4. The difference between two embodiments is in that the operation 406 in FIG. 4 is replaced by operation 506 in FIG. 5.

In the embodiment of FIG. 5, if the control circuit 207 determines that the current target access network fulfills all validity conditions of the received RAN rule in the operation 404, the control circuit 207 proceeds to the operation 506.

In operation 506, the control circuit 207 compares a priority level of a traffic specification of the target ANDSF rule with a priority level of the traffic specification of the RAN rule so as to determine which traffic to be steered to the access point 120 of the target access network 122. In operations, the priority level of the traffic specification of the ANDSF rules and the traffic specification of the RAN rule are configured by the operator of the communication system 100. In this embodiment, if the priority level of the traffic specification of the target ANDSF rule is higher than the priority level of the traffic specification of the RAN rule, the control circuit 207 proceeds to the operation 408. On the contrary, if the priority level of the traffic specification of the target ANDSF rule is less than the priority level of the traffic specification of the RAN rule, the control circuit 207 proceeds to the operation 410.

In practice, if the priority level of the traffic specification of the target ANDSF rule is equal to the priority level of the traffic specification of the RAN rule, the control circuit 207 may select one of the traffic specification of the target ANDSF rule and the traffic specification of the RAN rule as a default traffic specification according to a predetermined configuration, and control the second communication circuit 203 to steer traffic specified in the default traffic specification to the access point 120 of the target access network 122.

The aforementioned descriptions regarding the other operations in FIG. 4 are also applicable to the corresponding operations in FIG. 5.

Similar to the previous embodiment, the user equipment 102 only needs to determine whether the current target access network fulfills all validity conditions of the RAN rule in the operation 404, and needs not to scan for other available access networks, and needs not to respectively determine whether each of other available access network fulfills all validity conditions of the RAN rule. Therefore, the user equipment 102 is enabled to rapidly identify an available access point for traffic steering without spending unnecessary battery power to scan for other access networks. In this way, the power consumption of the user equipment 102 can be significantly reduced, thereby improving the power saving performance of the user equipment 102 and extending the standby time of the user equipment 102.

As can be appreciated from the forgoing descriptions, by further verifying whether the current target access network fulfills all validity conditions of the RAN rule in the operation 404, the control circuit 207 is enabled to integrate the different access network selection methods defined in different levels. As a result, it is ensured that the finally-selected access network fulfills both the ANDSF rule and the RAN rule, and also fulfills the intersystem mobility policies configured by the mobile communication network operator.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A communication system, comprising:
   a communication station, comprising:
   a transceiving circuit;
   a storage device configured to operably store an ANDSF (Access Network Discovery and Selection Function) rule set and a RAN (Radio Access Network) rule, wherein the RAN rule comprises one or more RAN validity conditions and a traffic specification, the ANDSF rule set comprises one or more ANDSF rules and each ANDSF rule comprises one or more ANDSF validity conditions and a prioritized network list; and
   a processor module, coupled with the transceiving circuit and the storage device, configured to operably control the transceiving circuit to transmit the ANDSF rule set and the RAN rule;
   multiple access points comprising a target access point; and
   a user equipment, comprising:
   a first communication circuit configured to operably receive the ANDSF rule set and the RAN rule transmitted from the transceiving circuit;
   a second communication circuit configured to operably communicate with the multiple access points;
   a memory device configured to operably store the ANDSF rule set and the RAN rule received by the first communication circuit; and
   a control circuit, coupled with the first communication circuit, the second communication circuit, and the memory device, configured to operably:
   select a target ANDSF rule out of the ANDSF rule set;
   determine whether the user equipment fulfills all validity conditions of the target ANDSF rule;
   select a target access network out of a prioritized network list defined by the target ANDSF rule when all validity conditions of the target ANDSF rule are fulfilled, wherein each of the valid conditions of the target ANDSF rule indicates at least one of: a location of the user equipment, and a time of a day;
   control the second communication circuit to scan the target access network so as to determine whether the target access network is present or not;
   determine whether the target access network fulfills all validity conditions of the RAN rule when the target access network is present, wherein each of the valid conditions of the RAN rule indicates at least one of: a traffic load of a RAN, a signal quality of the RAN, and a performance level of the RAN; and
   control the second communication circuit to steer traffic specified in the target ANDSF rule or traffic specified in the RAN rule to the target access point of the target access network when the target access network fulfills all validity conditions of the RAN rule,
   wherein the control circuit is further configured to operably compare a priority level of the target ANDSF rule with a priority level of the RAN rule so as to determine which traffic to be steered to the target access point, and
   wherein when the priority level of the target ANDSF rule is higher than the priority level of the RAN rule, the control circuit controls the second communication circuit to steer traffic specified in the target ANDSF rule to the target access point of the target access network.

2. The communication system of claim 1, wherein the control circuit is further configured to operably compare a priority level of a traffic specification of the target ANDSF rule with a priority level of the traffic specification of the RAN rule so as to determine which traffic to be steered to the target access point.

3. The communication system of claim 2, wherein when the priority level of the traffic specification of the target ANDSF rule is higher than the priority level of the traffic specification of the RAN rule, the control circuit controls the second communication circuit to steer traffic specified in the target ANDSF rule to the target access point of the target access network.

4. A user equipment of a communication system, wherein the communication system comprises a communication station and multiple access points, and the multiple access points comprise a target access point, the user equipment comprising:
   a first communication circuit configured to operably receive a ANDSF rule set and a RAN rule transmitted from the communication station, wherein the RAN rule comprises one or more RAN validity conditions and a traffic specification, the ANDSF rule set comprises one or more ANDSF rules and each ANDSF rule comprises one or more ANDSF validity conditions and a prioritized network list;
   a second communication circuit configured to operably communicate with the multiple access points;
   a memory device configured to operably store the ANDSF rule set and the RAN rule received by the first communication circuit; and
   a control circuit, coupled with the first communication circuit, the second communication circuit, and the memory device, configured to operably:
   select a target ANDSF rule out of the ANDSF rule set;
   determine whether the user equipment fulfills all validity conditions of the target ANDSF rule;
   select a target access network out of a prioritized network list defined by the target ANDSF rule when all validity conditions of the target ANDSF rule are fulfilled, wherein each of the valid conditions of the target ANDSF rule indicates at least one of: a location of the user equipment and a time of a day;
   control the second communication circuit to scan the target access network so as to determine whether the target access network is present or not;
   determine whether the target access network fulfills all validity conditions of the RAN rule when the target access network is present, wherein each of the valid conditions of the RAN rule indicates at least one of: a traffic load of a RAN, a signal quality of the RAN, and a performance level of the RAN; and
   control the second communication circuit to steer traffic specified in the target ANDSF rule or traffic specified in the RAN rule to the target access point of the target access network when the target access network fulfills all validity conditions of the RAN rule, wherein the control circuit is further configured to operably compare a priority level of the target ANDSF rule with a priority level of the RAN rule so as to determine which traffic to be steered to the target access point, and wherein when the priority level of the target ANDSF rule is higher than the priority level of the RAN rule, the control circuit controls the second communication circuit to steer traffic specified in the target ANDSF rule to the target access point of the target access network.

5. The user equipment of claim 4, wherein the control circuit is further configured to operably compare a priority level of a traffic specification of the target ANDSF rule with a priority level of the traffic specification of the RAN rule so as to determine which traffic to be steered to the target access point.

6. The user equipment of claim 5, wherein when the priority level of the traffic specification of the target ANDSF rule is higher than the priority level of the traffic specification of the RAN rule, the control circuit controls the second communication circuit to steer traffic specified in the target ANDSF rule to the target access point of the target access network.

* * * * *